United States Patent
Bondarowicz et al.

(10) Patent No.: US 6,379,093 B1
(45) Date of Patent: Apr. 30, 2002

(54) CAPTIVE FASTENER MEMBER AND SYSTEM FOR JOINING TWO WORK PIECES

(75) Inventors: Frank A. Bondarowicz, Park Ridge; Stephen R. Dohm, Schaumburg; James D. Jones, Jr., Barrington, all of IL (US); Todd L. Tesky, Sheboygan, WI (US); Glenn G. Heavens, Cheshire, CT (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/593,654

(22) Filed: Jun. 13, 2000

(51) Int. Cl.[7] .................................................. F16B 21/18
(52) U.S. Cl. ......................... 411/353; 411/525; 411/999
(58) Field of Search ................................. 411/525, 526, 411/527, 433, 437, 352, 353, 970, 999

(56) References Cited

U.S. PATENT DOCUMENTS

| | | | |
|---|---|---|---|
| 2,244,975 A | * | 6/1941 | Tinnerman |
| 2,420,826 A | | 7/1947 | Irrgang |
| 2,492,115 A | | 12/1949 | Crowther |
| 2,672,659 A | | 3/1954 | Becker |
| 3,027,670 A | * | 4/1962 | Kramer |
| 3,226,145 A | * | 12/1965 | Goldberg |
| 3,394,747 A | | 7/1968 | Duffy |
| 3,437,199 A | | 4/1969 | Jacobson |
| 4,248,131 A | | 2/1981 | Larro |
| 4,615,655 A | | 10/1986 | Dixon |
| 4,732,519 A | * | 3/1988 | Wagner |
| 4,952,107 A | | 8/1990 | Dupree |
| 5,082,407 A | | 1/1992 | Mickiewicz |
| 5,395,194 A | | 3/1995 | Johnson et al. |
| 5,531,554 A | | 7/1996 | Jeanson et al. |
| 5,645,282 A | * | 7/1997 | Belter |
| 6,174,118 B1 | | 1/2001 | Rebers et al. |

OTHER PUBLICATIONS

Drawing by Hitchiner, "Bolt Retainer".

* cited by examiner

Primary Examiner—Flemming Saether
(74) Attorney, Agent, or Firm—Mark W. Croll; Lisa M. Soltis; Paul F. Donovan

(57) ABSTRACT

A fastener retention system having a retention member with an opening therein, a flange protruding outwardly from the retention member, a plurality of resilient work piece engagement tabs protruding outwardly from retention member, and a shank disposed in the retention member opening and engaged by a plurality of fastener engagement tabs, whereby the retention member is axially retained about the shank.

20 Claims, 1 Drawing Sheet

CAPTIVE FASTENER MEMBER AND SYSTEM FOR JOINING TWO WORK PIECES

BACKGROUND OF THE INVENTION

The invention relates generally to fastening systems, and more particularly to fastener retention members for pre-assembly with fasteners.

It is known generally to pre-assemble a fastener in the bore of a work piece prior to mounting the work piece on a mounting surface.

U.S. Pat. No. 5,395,194 entitled "Convoluted Bolt Retainer", for example, discloses a polymeric retainer having a thin wall annular body member comprising an alternate arrangement of arcuate ribs and ears about a central opening. The polymeric retainer is preassembled into a stepped bore in a structural member and is retained therein by elastic deformation of the retainer walls. The elastic body member retains a bolt shaft disposed in the opening thereof prior to mounting of the structural member on a mounting surface.

An object of the present invention is to provide novel fastening systems and retention members therefor that overcome problems in and improve upon the prior art.

Another object of the invention is to provide novel fastening systems and retention members therefor that are reliable and economical.

Another object of the invention is to provide novel fastener retention members that may be pre-assembled with standard fasteners without modification to the fastener.

A further object of the invention is to provide novel fastening systems and retention members therefor that may be retained in the bore of a work piece without modification of the work piece.

Yet another object of the invention is to provide novel fastening systems and retention members therefor that retain fastener shafts retracted within an opening of a work piece when the retention member and fastener are pre-assembled therewith.

Still another object of the invention is to provide novel fastening systems and retention members therefor that compensate for misalignment between first and second openings in corresponding work pieces to be mounted together.

A more particular object of the invention is to provide fastener retention members comprising a body member having a flange protruding outwardly from an axial opening thereof, a fastener engagement member protruding into the axial opening, and a work piece engagement member protruding outwardly from the axial opening of the body member.

Another more particular object of the invention is to provide fastener retention members comprising a body member having a flange protruding outwardly from an end thereof, a plurality of fastener engagement tabs protruding into an axial opening of the body member, and a plurality of resilient work piece engagement tabs protruding outwardly from the axial opening of the body member, preferably extending toward the flange.

Yet another more particular object of the invention' is to provide retention systems comprising a retention member having body member with an opening, a flange protruding outwardly from the opening of the body member, a plurality of resilient work piece engagement tabs protruding outwardly from the opening of the body member, and a shank disposed in the opening of the body member and engaged by a plurality of shank engagement tabs protruding therein, whereby the retention member is axially retained about the shank for assembly in the bore of a work piece.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

DETAILED DESCRIPTION OF THE INVENTION

Figure 1:
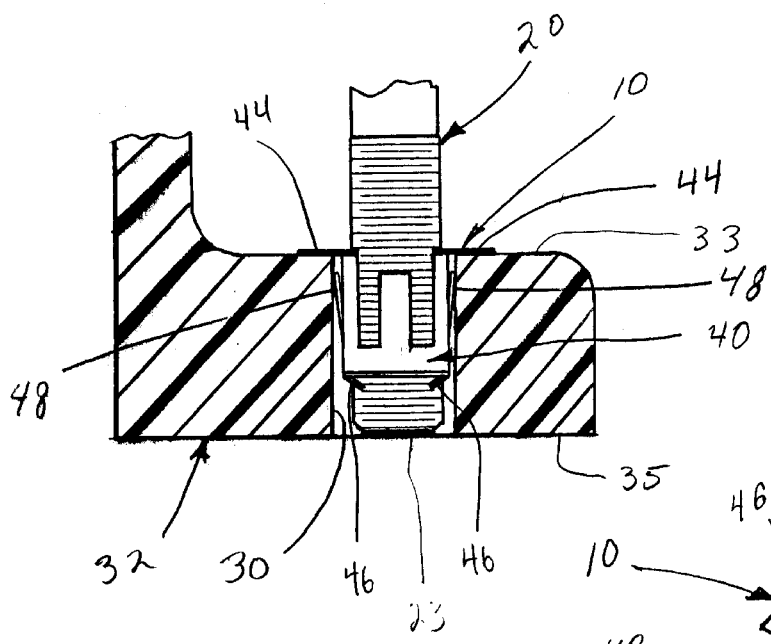
FIG. 1 is side view of a fastener retention system disposed in the bore of a work piece prior to mounting the work piece on a mounting surface according to an exemplary embodiment of the invention.

FIG. 1 illustrates a retention member 10 retaining a threaded bolt shaft 20 in an opening or bore 30 through a work piece 32 prior to mounting the work piece 32 onto a mounting surface of another work piece, as discussed below. The work piece 32 may for example be an oil pan or a cover member, and the mounting surface may be an engine block.

Figure 2:
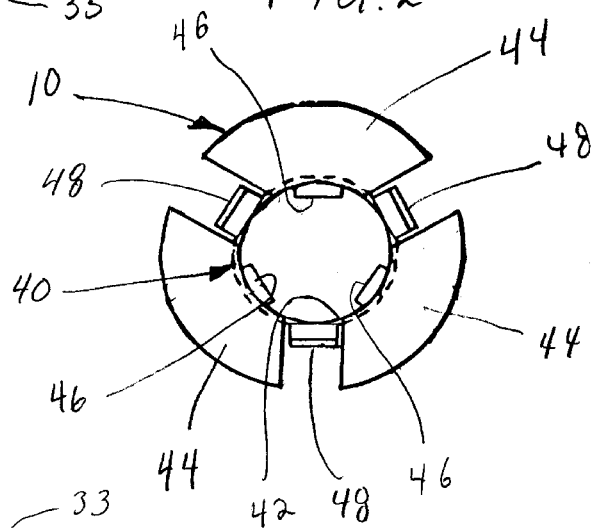
FIG. 2 is a plan view of a fastener retention member.

In FIG. 2, the retention member 10 generally comprises a body member 40 having an axial opening 42 therethrough for accommodating the shaft member or a shank, a flange protruding outwardly from the axial opening of the body member, a shank engagement member protruding into the axial opening of the body member, and a work piece engagement member protruding outwardly from the axial opening of the body member.

In FIGS. 1 and 2, the exemplary flange comprises a plurality of discrete portions 44 extending generally radially outwardly from an end of the body member 40, but in other embodiments the flange may be a non-discrete or continuous annular member.

Figure 3:
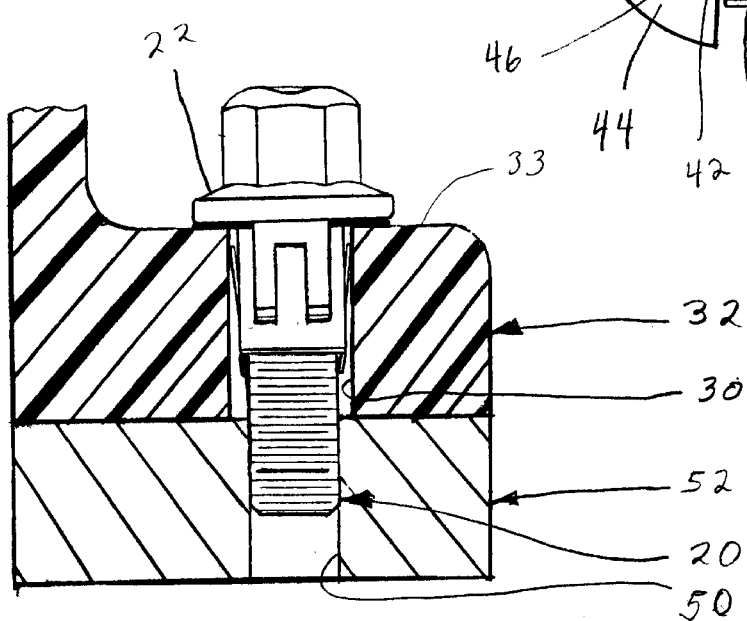
FIG. 3 is a side view of a retention system disposed in the bore of a work piece after mounting the work piece on a mounting surface.

The diameter of the flange or portions thereof 44 is greater than the diameter of the work piece opening 30. The flange limits the extent to which the retention member 10 may be axially disposed into the work piece opening 30, and is preferably sufficiently large to provide support and permit lateral movement of the retention member 10 in the bore 30. In some applications, the flange may help support the body member 40 in the bore 30, and may provide a mounting surface for a head portion 22 of the fastener as illustrated in FIG. 3.

In the exemplary embodiment of FIG. 2, the shank engagement member comprises three fastener engagement tabs 46 protruding into the axial opening 42 of the body member 40 for locating and retaining the threaded shaft 20 therein. In other embodiments, there may be more or less than three fastener engagement tabs.

In some embodiments, the tabs 46 may be configured to follow the thread pitch of the threaded shaft 20, thereby improving assembly and alignment therewith. The fastener engagement tabs 46 may also be directed slightly away from the flange portions 44 so that the tabs 46 will bend away from the threaded shaft 20 if any misalignment occurs while advancing or driving the threaded shaft 20 through the retention member.

In the exemplary embodiment of FIG. 2, work piece engagement member comprises three resilient work piece engagement tabs 48 protruding outwardly from the axial opening 42 of the body member. Other embodiments may include more or less work piece engagement tabs.

A portion of the work piece resilient engagement tabs 48 extends outwardly beyond the diameter of the work piece opening 30 prior to insertion of the body member therein. In FIG. 1, the resilient engagement tabs 48 preferably extend toward the flange portions 44, thereby facilitating insertion of the body member 40 into the work piece opening.

The fastener retention member or retainer 10 is preferably a unitary metal member formed, for example, in a stamping operation.

In some applications, the retention member 10 is pre-assembled with a threaded fastener 20, and the assembly is subsequently installed into the opening of a work piece. In other applications, the retention member is installed in opening 30 without the shaft member.

To assemble the retention member 10 and the threaded shaft 20, the shaft is generally inserted into the body member opening 42 and axially positioned relative thereto. The threaded shaft 20 may be screwed into the retention member opening 42 upon threaded engagement with fastener engagement tabs 46 thereof configured for mating screw thread engagement therewith. Alternatively, the fastener shaft 20 or an un-threaded shank may merely be driven forcefully through the opening 42 against the frictional engagement of the tabs 46, depending on configuration of the tabs 46 and preferences of the assembler.

The engagement between the retention member 10 and shaft member 20 disposed in the opening thereof depends generally upon the frictional engagement therebetween, which is determined largely by the configuration of the fastener engagement tabs 46 and the properties of the material from which the retention member is fabricated.

The retention member 10 is generally disposed in the work piece opening 30, with or without the shaft member. During insertion, the resilient work piece engagement tabs 48, which extend radially beyond the diameter of the work piece opening 30 prior to installation, are flexed inwardly against their bias upon engagement with the wall portion of the work piece opening 30. The flange portions 44 of the retention member engage a surface 33 of the work piece 32 to limit insertion of body member 40 therein. Thereafter, the resilient tabs 48 are urged outwardly against the work piece opening 30 to locate and axially retain the body member therein.

The engagement between the retention member 10 and the work piece opening 30 depends generally upon the frictional engagement therebetween, which is determined largely by the configuration of the work piece engagement tabs 48 and the properties of the material from which the retention member is fabricated.

In applications where the shaft member is disposed into an opening of a second work piece on which the first work piece is to be mounted, the shaft member is preferably positioned axially relative to the retention member 10 so that a leading end 23 of the fastener shaft does not extend beyond a second surface 35 of the first work piece 32 prior to mounting thereof on the mounting surface of the second work piece, as illustrated in FIG. 1.

In FIG. 3, the resilient nature of the work piece engagement tabs 48 permits the retention member 10 to float radially in the first work piece opening 30, thereby facilitating alignment of the fastener shaft 20 with a second opening 50 in the second work piece 52 prior to insertion of the shaft 20 into the second opening 50.

While the foregoing written description of the invention enables one of ordinary skill to make and use what is considered presently to be the best mode thereof, those of ordinary skill will understand and appreciate the existence of variations, combinations, and equivalents of the specific exemplary embodiments herein. The invention is therefore to be limited not by the exemplary embodiments herein, but by all embodiments within the scope and spirit of the appended claims.

What is claimed is:

1. A fastener retention member retaining a threaded fastener, the fastener joining a first work piece having an opening therein and a second work piece having a threaded opening therein, said fastener retention member comprising:

a body member having an axial opening;

a flange protruding outwardly from the axial opening of the body member;

a fastener engagement member protruding into the axial opening of the body member at an end of the body member opposite the flange for engaging the threads of the fastener;

a work piece engagement member protruding outwardly from the axial opening of the body member; and wherein said fastener retention member retains the fastener such that in a pre-assembled condition said flange engages the first work piece said work piece engagement member engages a surface of the first work piece defined by the opening extending through the first work piece, and said fastener does not extend beyond the first work piece, and such that in an assembled condition, said flange remains in engagement with the first work piece, said work piece engagement member remains in engagement with the surface of the first work piece defined by the opening extending through the first work piece, and the treads of the fastener engage the threads of the threaded opening of the second work piece.

2. The retainer of claim 1, the flange protrudes farther from the axial opening than the work piece engagement member.

3. The retainer of claim 1, the fastener engagement member is a plurality of tabs protruding into the axial opening of the body member.

4. The retainer of claim 1, the work piece engagement member is plurality of resilient tabs protruding outwardly from the axial opening of the body member.

5. The retainer of claim 1, the flange extends generally radially from an end of the body member.

6. The retainer of claim 5 is a unitary metal member.

7. A fastener retention member retaining a threaded fastener, the fastener joining a first work piece having an opening therein and a second work piece having a threaded opening therein, said fastener retention member comprising:

a body member having an axial opening therein;

a flange disposed at an end of the body member and protruding outwardly from the axial opening thereof;

a plurality of fastener engagement tabs protruding into the axial opening of the body member at an end of the body member opposite the flange for engaging the threads of the fastener;

a plurality of resilient work piece engagement tabs protruding outwardly from the axial opening of the body member; and wherein said fastener retention member retains the fastener such that in a pre-assembled condition said flange engages the first work piece, said work piece engagement tabs engage a surface of the first work piece defined by the opening extending through the first work piece, and said fastener does not extend beyond the first work piece, and such that in an assembled condition, said flange remains in engagement with the first work piece, said work piece engagement tabs remain in engagement with the surface of the first work piece defined by the opening extending through the first work piece, and the threads of the fastener engage the threads of the threaded opening of the second work piece.

8. The retainer of claim 7, the flange protrudes farther from the axial opening than the plurality of work piece engagement tabs.

9. The retainer of claim 7, the plurality of fastener engagement tabs protruding into the axial opening of the body member have a screw thread pitch.

10. The retainer of claim 7, the plurality of work piece engagement tabs protruding outwardly from the axial opening of the body member extend toward the flange.

11. The retainer of claim 10, the plurality of fastener engagement tabs protruding into the axial opening of the body member have a screw thread pitch, the plurality of work piece engagement tabs extend toward the flange.

12. The retainer of claim 7 is a unitary metal member formed in a stamping operation.

13. A fastener retention system joining a first work piece having an opening therein and a second work piece having a threaded opening therein, said fastener retention system comprising:
   a retention member having a body member with an opening;
   a flange protruding outwardly from the opening of the body member;
   a plurality of shank engagement tabs protruding into the opening of the body member at an end of the body member opposite the flange;
   a plurality of resilient work piece engagement tabs protruding outwardly from the opening of the body member;
   a threaded shank disposed into the opening of the body member, the shank engagement tabs engaged with the shank;
   whereby the retention member is axially retained about the shank; and
   wherein said retention member retains said shank such that in a pre-assembled condition said flange engages the first work piece, said work piece engagement tabs engage a surface of the first work piece defined by the opening extending through the first work piece, and said shank does not extend beyond the first work piece, and such that in an assembled condition, said flange remains in engagement with the first work piece, said work piece engagement tabs remain in engagement with the surface of the first work piece defined by the opening extending through the first work piece, and the threads of said shank engage the threads of the threaded opening of the second work piece.

14. The system of claim 13, the shank is a threaded fastener shaft, the plurality of shank engagement tabs protruding into the axial opening of the body member have a screw thread pitch and are engaged with a threaded portion of the fastener shaft.

15. The system of claim 13, the plurality of work piece engagement tabs protruding outwardly from the axial opening of the body member extend toward the flange.

16. The system of claim 13, the retention member is a unitary metal member.

17. The system of claim 13, a work piece having first and second opposite surfaces and an opening therebetween, the retention member disposed into the opening of the work piece, the flange extends from an end of the body member and is disposed on the first surface of the work piece, the plurality of work piece engagement tabs of the retention member are urged against the opening of the work piece.

18. The system of claim 17, the shank has a leading end, the leading end of the shank does not extend beyond the second surface of the work piece.

19. The system of claim 17, the shank is a threaded fastener shaft, the plurality of shank engagement tabs protruding into the axial opening of the body member engaged with a threaded portion of the fastener shaft.

20. The system of claim 19, the retention member is a unitary metal member.

* * * * *